Jan. 5, 1937.  C. P. WEST  2,066,919
REGULATING SYSTEM
Filed Oct. 15, 1935
Fig. 1.
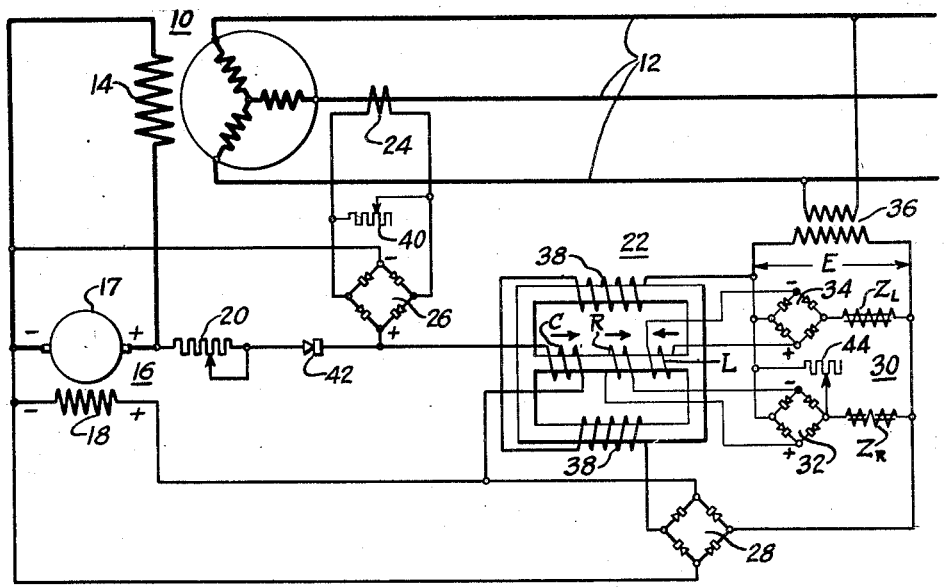
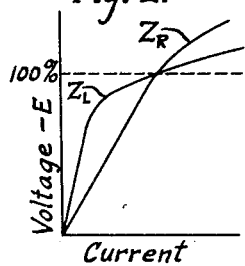
Fig. 2.
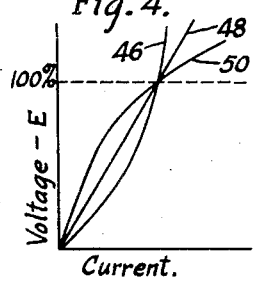
Fig. 4.
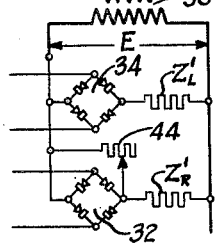
Fig. 3.
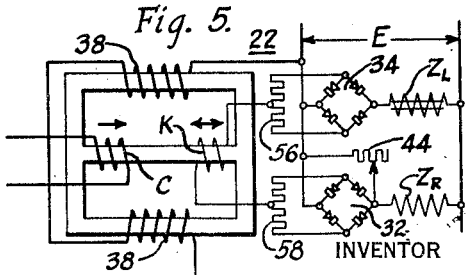
Fig. 5.
WITNESSES:
Leon J. Taza.
C. J. Bryant
INVENTOR
Charles P. West.
BY Ezra W. Savage
ATTORNEY Patented Jan. 5, 1937

2,066,919

UNITED STATES PATENT OFFICE 2,066,919

REGULATING SYSTEM

Charles P. West, Forest Hills, Pa., assignor to Westinghouse Electric & Manufacturing Company, East Pittsburgh, Pa., a corporation of Pennsylvania Application October 15, 1935, Serial No. 45,029

12 Claims. (Cl. 171—119)

My invention relates to regulating systems and it has particular relation to systems for maintaining constant the voltage of an electrical generator or other dynamo-electric machine under widely differing conditions of operation.

In United States Patent 1,710,755, which issued to me April 30, 1929, I have disclosed and claimed several preferred arrangements for a system of generator voltage regulation in which a saturable-core reactor effects the necessary excitation control. Such a system is exceedingly reliable in operation and may be built up exclusively of simple rugged units, no moving-part, electronic-tube or other devices requiring maintenance or replacement being required. The present invention is directed to further improvements in regulating systems of this general character.

Generally stated, the object of my invention is to lower the cost, simplify the construction, and improve the performance of regulating systems of the described type.

Another object is to provide a form of saturable-core reactor voltage regulating equipment which is especially suitable for application to alternating-current machines provided with separate exciting generators.

A further object is to raise the speed of corrective response to voltage, load and power factor change of which systems of this class are capable.

An additional object is to facilitate the obtaining of any desired degree of position or negative load compensation.

My invention itself, together with additional objects and advantages thereof will best be understood from the following description of specific embodiments when taken in conjunction with the accompanying drawing, in which:

Figure 1 is a diagrammatic view of apparatus and circuits illustrating one preferred form of the system of my invention applied to regulate the voltage of an alternating-current generator having a seperate exciter;

Fig. 2 is a diagram of curves applicable to the non-linear error-measuring circuits which form a part of the system of Fig. 1;

Fig. 3 is a diagram showing how the reactors comprised by the non-linear circuits of Fig. 1 may be replaced by resistors having different current-resistance characteristics;

Fig. 4 is a diagram of curves applicable to the resistors comprised by the circuits of Fig. 3; and Fig. 5 is a diagram showing how the two error-sensitive core-saturating windings comprised by the reactor of the system of Fig. 1 may be replaced by a single winding energized through a modified form of error-sensitive bridge circuit.

Referring to the drawing, I have in Fig. 1 shown my improved regulating system as being applied to maintain constant the voltage of an alternating-current generator or other dynamo-electric machine 10, the armature windings of which are directly connected with the conductors 12 of an output circuit and the field winding 14 of which is supplied with energizing current by a direct-current exciter 16.

In the illustrated system, the field winding 18 of this exciter is jointly energized from three separate sources. The first is the exciter armature 17 which supplies current through a circuit including a rheostat 20 and a saturating winding C carried on the central leg of a saturable-core reactance device 22. The magnitude of this current is preferably sufficient to maintain the voltage of machine 10 at a substantial percentage of its desired value when the machine is operating without load.

The second source is a current transformer 24 connected in one of the conductors of the generator output circuit 12, and adapted to supply through a rectifier 26 an additional or compounding current proportional to the loading of generator 10. The third source is the generator output circuit 12 which further supplies to the exciter field winding 18 a voltage-correcting current through a circuit shown as including a transformer 36, the windings 38 of the beforementioned saturable-core reactor 22 and a rectifier 28.

In order that current supplied by the compounding circuit will not, at times when the output voltage of rectifier 26 tends to exceed the armature voltage of exciter 16, be permitted to feed back into the exciter source of supply, a rectifier 42 is included in the manner shown in the circuit of which the last-named source forms a part. All of the rectifiers utilized in my regulating system are preferably, though of course not necessarily, of the now well known copper-oxide dry-disc type, the first cost of which is relatively low and the length of operating life of which may be made practically unlimited.

The current supplied to the exciter field winding through the third-named circuit is jointly controlled by a core-saturating winding C, through which the exciting current supplied by both of the circuits first-named is circulated, and by a pair of opposition-connected saturating windings R and L which are energized through two non-linear circuits combination 30 in accordance with the magnitude of the voltage of regulated circuit 12. The energizing currents supplied to windings R and L are respectively derived from rectifiers 32 and 34 which are series connected with a pair of reactors $Z_R$ and $Z_L$ to constitute the before referred to non-linear circuit combination 30, the two parallel paths of which are energized by a measure E of the regulated voltage.

In a reactor of the three-legged core construction illustrated at 22 the impedance to the flow of alternating current through the windings 38 carried by the two outer legs is determined by the degree of saturation of the core structure. In the system of Fig. 1 this saturation is jointly produced by the direct-current energized windings C, R and L carried by the central core leg. An increase in core saturation lowers the reactor impedance and thereby raises the current which rectifier 28 supplies to the exciter field winding 18 while a decrease in saturation similarly acts to lower this current.

In operation of the complete system of Fig. 1, the reactor saturating winding C, which as before mentioned is energized by the current jointly supplied to winding 18 from the exciter armature and the compounding transformer 24, produces a major portion of the adjustment in the voltage-correcting current which rectifier 28 supplies, windings R and L accounting for only a minor portion. Preferably, the exciter field rheostat 20 is so set that the exciter armature provides sufficient field current to give approximately 90% regulated machine voltage at no load condition or when there is no compounding current. The illustrated compounding transformer 24 supplies a major portion of the additional current required to maintain approximately the correct voltage from no load to full load.

Even with it, however, there may be considerable error in the generator voltage as the load changes, principally due to the saturation of both of the generator and exciter magnetic circuits and the change in excitation required for a given load as the power factor varies. Consequently, in most regulating applications the before-described voltage-correcting arrangement, involving error-sensitive circuits 30, is needed to correct these errors in order that the voltage may at all times be maintained within relatively narrow limits. Where, however, only approximate accuracy is needed, control by winding C only will be found adequate.

In the error-sensitive circuits of Fig. 1, differences in the saturation characteristics of the two reactors $Z_L$ and $Z_R$ are utilized to vary the relative energizations of core-saturating windings L and R in response to changes in the voltage of circuit 12. Preferably reactor $Z_L$ is designed to saturate at approximately 90% normal voltage, it having a relatively small amount of iron. The other reactor $Z_R$, on the other hand, is designed to saturate at approximately 110% normal voltage, it having a small air gap in its magnetic circuit. It will be observed from Fig. 2 that the characteristic curves applicable to these reactors intersect at the desired value (100%) of regulated voltage, which, of course, means that the currents which they pass to the saturating windings R and L are equal for this condition.

Consequently, when the voltage of circuit 12 is of the desired value, the magnetizing effects of opposition-connected windings R and L cancel each other and cause the saturation of reactor 22 to be determined solely by the current which traverses winding C. This permits the reactor 22 to pass an intermediate value of current from transformer 36 to rectifier 28 which, in turn, contributes an intermediate additional amount of energizing current to the exciter field winding 18.

As the voltage of circuit 12 rises above the desired value, the current flow (see Fig. 2) through reactor $Z_L$ increases more rapidly than does that through reactor $Z_R$. The net increase produced by winding L subtracts, as indicated by the arrows of Fig. 1, from the magnetizing effect of winding C to decrease the saturation of reactor 22. The resulting increase in the reactor impedance lowers the current supplied through rectifier 28 to the exciter field winding and thereby correctively reduces the voltage of machine 10 back to its desired value.

In a similar manner, when the regulated voltage drops below this desired value, the current flow through reactor $Z_R$ decreases less rapidly than does that through reactor $Z_L$ with the result that the magnetizing effect of winding R overbalances that of winding L. This net differential aids (see again the arrows of Fig. 1) winding C in saturating the reactor 22. This added saturation lowers the reactor impedance and causes rectifier 28 to increase the current which it supplies to the exciter field winding. This increase correctively raises the voltage machine 10 back to its desired value.

As before pointed out, windings R and L merely supplement the winding C in its major adjustment of the reactor saturation. Without them the reactor 22 would still function to maintain the regulated voltage within the approximate limits which the compensating-current energized winding C determines. In the complete system, therefore, the range of saturation adjustment produced by winding C is several times that effected by supplemental windings R and L in their maintenance of the regulated voltage within the narrower limits.

In the arrangement shown, this supplemental corrective action is determined by the horizontal separation of the two curves $Z_R$ and $Z_L$ of Fig. 2. Thus as the regulated voltage approaches normal or 100% value, the difference in current supplied to the saturating windings progressively diminishes, an action which automatically prevents the regulator from overshooting and thereby makes unnecessary the use of special anti-hunting means which are required in other comparable systems of regulation. Likewise, as the voltage departs from normal the separation between the curves increases rapidly which means that the change in reactor saturation becomes relatively large and the speed of response is correspondingly high.

The accuracy of regulation obtained depends both upon the amplification factor of the saturable core reactor and the sensitivity of the error-measuring bridge 30. As in practice, a ratio as high as 50 to 1 between load and control energy is obtainable without difficulty in the reactor, commercial accuracies for regulating purposes are readily available. By raising the amplification factor of the reactor, and of the non-linear bridge 30 which controls it, exceedingly high sensitivities are, of course, obtainable.

For the purpose of changing the voltage which the regulator maintains, an adjustable rheostat 44 may be connected across one of the rectifiers 32 or 34 of the circuit 30. In the illustrated connection, changes in the rheostat adjustment shift the position of the characteristic curve of reactor $Z_R$ to the left or to the right, thus lowering or raising the point of intersection with the curve $Z_L$.

Instead of using in the non-linear circuit combination a pair of reactors having dissimilar saturation characteristics of the type explained, the same results may be achieved by substituting, as shown in Fig. 3, a pair of resistors $Z'_R$ and $Z'_L$ having the dissimilar current-resistance characteristics typified by any two of the curves 46, 48 and 50 in Fig. 4. Both of the described arrangements introduce practically no error due to frequency changes, such changes affecting the two reactors (Fig. 1) in approximately the same way and affecting the resistors (Fig. 3) not at all.

In the system of Fig. 1, the finer adjustments in regulated voltage are effected through the use of the two opposition core-saturating windings R and L. As shown in Fig. 5, these may be replaced by a single winding K which is energized by a measure of the difference between the currents which traverse the impeders $Z_L$ and $Z_R$. Each of the associated rectifiers 34 and 32 is connected with a loading resistor, respectively shown at 56 and 58, and the reactor saturating winding K is energized by the voltage appearing between the midpoints of these two resistors.

When the voltage E impressed upon the impeder circuits is of the desired value, the potential difference between the resistor midpoints will be zero. When below this value, winding K will receive a current of one polarity; when above this value, the polarity of this current will reverse. Winding K will thus either aid or oppose winding C in its major saturation of the reactor core.

By suitable adjustments in the regulating system of Fig. 1 either a rise or a drop in voltage with increasing load on machine 10 may be provided. The arrangement shown is capable of providing a rising-with load characteristics of a magnitude determined by the adjustment of compensating circuit rheostat 40. When the rheostat shunts a minimum portion of the load-proportional current away from the rectifier 26, the rising compensation will be maximum. When the shunted current is maximum, the compensation will be so cut down as to approach the normally inherent drooping characteristic of the regulated machine 10.

Although I have shown and described certain specific embodiments of my invention, I am fully aware that many modifications thereof are possible. My invention, therefore, is not to be restricted except insofar as is necessitated by the prior art and by the scope of the appended claims.

I claim as my invention:

1. In a regulating system for a dynamo-electric machine having an excitation-determining winding, the combination of a circuit for supplying to said winding an energizing current determined by the machine loading, a second circuit for supplying further current to the winding, a current-adjusting reactor included in said second circuit, said reactor having a core-saturating winding, and means for energizing said saturating winding by a measure of the current supplied through the circuit first named.

2. In a regulating system for a dynamo-electric machine having an exciting generator provided with a field winding, the combination of a circuit through which the machine exciting voltage supplies energizing current to said winding, a second circuit for supplying to the winding an additional energizing current determined by the machine loading, a third circuit for supplying still further current to said winding, a current-adjusting reactor included in said last-named circuit, said reactor having a core-saturating winding, and means for energizing said winding by a measure of the current jointly supplied through the two circuits first named.

3. In a regulating system for a dynamo-electric machine having an exciting generator provided with a field winding, the combination of a circuit through which the machine exciting voltage supplies energizing current to said winding, a second circuit for supplying to the winding an additional energizing current determined by the machine loading, a third circuit for supplying still further current to the winding, a current-adjusting reactor included in said last-named circuit, said reactor having core-saturating windings, means for energizing one of said windings by a measure of the current jointly supplied through the two circuits first named, and means for energizing other of said saturating windings in accordance with the magnitude of the machine voltage.

4. In a regulating system for a dynamo-electric machine having an exciting generator provided with a field winding, the combination of circuits through which measures of the machine exciting voltage and machine load current supply energizing current to said winding, another circuit for supplying further current to the winding, a current-adjusting reactor included in said last-named circuit, said reactor having core-saturating windings, means for energizing one of said windings by a measure of the current supplied through the circuits first named, and means sensitive to variations in the voltage of said machine for energizing another of said windings.

5. In a regulating system for an alternating-current machine having associated therewith an excitation-determining winding, the combination of a rectifier, a circuit for supplying therethrough to said winding an energizing current proportional to the machine loading, a second rectifier, a second circuit adapted to be energized by the machine voltage for supplying further current to said winding through the said second rectifier, a saturable-core current-adjusting reactor included in said second circuit, and means for saturating the core of said reactor in accordance with the machine voltage and load current.

6. In a regulating system for an alternating-current machine having an exciting generator provided with a field winding, the combination of a circuit, including a rectifier, through which the machine load current supplies current to said winding, a second circuit, also including a rectifier, through which the machine voltage supplies further current to said winding, and a saturable-core reactor included in said second circuit and adapted to adjust the current flow therethrough in accordance with changes in a characteristic of said machine.

7. In a regulating system for an alternating-current machine having an exciting generator provided with a field winding, the combination of a circuit through which the voltage of said exciting generator supplies energizing current to said winding, a second circuit, including a rectifier, through which the machine load current supplies current to said winding, a third circuit, also including a rectifier, through which the machine voltage supplies further current to said winding, a current-adjusting reactor included in said third circuit and having impedance-determining windings, means for energizing one of said windings by a measure of the current supplied through the two circuits first named, and means sensitive to variations in the machine voltage for energizing other of said windings.

8. In a system for regulating the voltage of an electrical circuit, the combination of voltage-adjusting means comprising a reactor having three core-saturating windings, means for supplying a uni-directional energizing current to one of said windings, two circuits having dissimilar current-impedance characteristics, means for energizing said circuits by a measure of said circuit voltage, and means for energizing in opposing senses the other two of said saturating windings by the currents which respectively traverse said two dissimilar circuits.

9. In a system for regulating a characteristic of an alternating-current circuit, the combination of characteristic-adjusting means comprising a reactor having three core-saturating windings, means for supplying a unidirectional current to one of said windings, two parallel circuits of dissimilar current-impedance characteristics, a rectifier included in each of said circuits and respectively connected with one each of the other two of said saturating windings, and means for energizing said circuits by a voltage proportional to the said characteristic of the alternating-current circuit.

10. In a system wherein a pair of control windings effect adjustment of a characteristic of an electrical circuit in response to unbalance in their energization, the combination of a pair of impeders having dissimilar current-impedance characteristics, means for impressing upon said impeders a voltage proportional to said circuit characteristic, and means for energizing said control windings by measures of the currents which respectively traverse said impeders.

11. In a system wherein a pair of control windings effect adjustment of a characteristic of an electrical circuit in response to unbalances in their energizations, the combination of a pair of reactors having dissimilar voltage-saturation characteristics, means for impressing upon said reactors a voltage proportional to said circuit characteristic, and means for energizing said control windings by measures of the currents which respectively traverse said reactors.

12. In a system wherein a pair of control windings effect adjustment of a characteristic of an electrical circuit in response to unbalances in their energizations, the combination of a pair of resistors having dissimilar current-resistance characteristics, means for impressing upon said resistors a voltage proportional to said circuit characteristic, and means for energizing said control windings by measures of the currents which respectively traverse said resistors.

CHARLES P. WEST.